No. 663,059. Patented Dec. 4, 1900.
W. W. ZVORIKIN & S. DE BLUMENTHAL.
AUTOMATIC ELECTRICAL APPARATUS FOR INDICATING LEAKS IN SHIPS.
(Application filed Mar. 24, 1899.)

(No Model.)

Witnesses
Inventors
Wladimir W. Zvorikin
Serge de Blumenthal
by their Attorneys

UNITED STATES PATENT OFFICE.

WLADIMIR WASSILI ZVORIKIN AND SERGE DE BLUMENTHAL, OF MOSCOW, RUSSIA.

AUTOMATIC ELECTRICAL APPARATUS FOR INDICATING LEAKS IN SHIPS.

SPECIFICATION forming part of Letters Patent No. 663,059, dated December 4, 1900.

Application filed March 24, 1899. Serial No. 710,387. (No model.)

*To all whom it may concern:*

Be it known that we, WLADIMIR WASSILI ZVORIKIN and SERGE DE BLUMENTHAL, subjects of the Emperor of Russia, residing at Moscow, in the Empire of Russia, have invented certain new and useful Improvements in Automatic Electrical Apparatus for Indicating Leaks in Ships, (for which we have applied for a patent in Germany, filed February 6, 1899, and in England, filed February 6, 1899, No. 2,665,) of which the following is a specification.

Our invention relates to means for indicating leaks in ships, and has for its object to provide improved means for this purpose; and to these ends it consists in an apparatus embodying the general features of construction and having the general mode of operation substantially as hereinafter pointed out.

Figure 1:
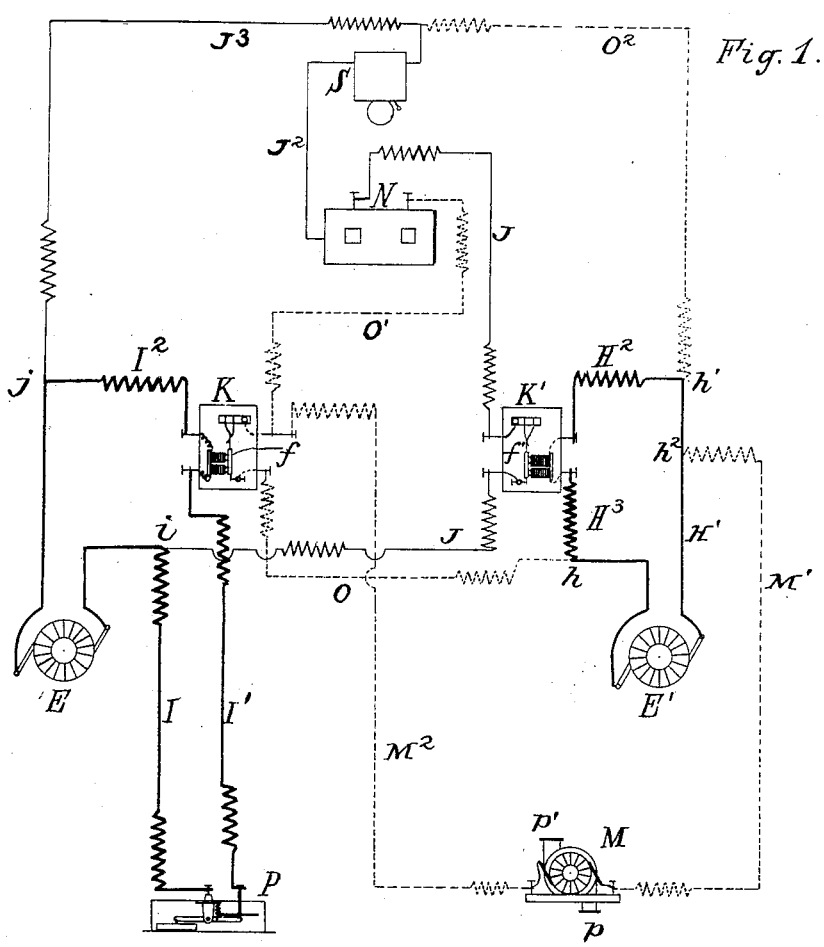
Figure 2:
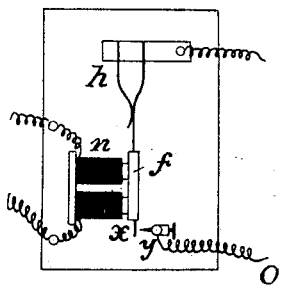
Figure 3:
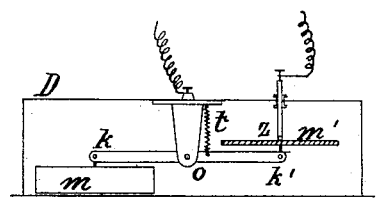

In the accompanying drawings, Figure 1 is a diagram showing one arrangement of circuits in a simple form, but sufficient to illustrate the general principles of our invention. Fig. 2 is a detail view showing one of the switches or relays; and Fig. 3 is a detail showing, on an enlarged scale, one of the circuit-breakers preferably used.

In the practical utilization of our invention we provide an electric circuit having a constant source of electric energy, and in this circuit is arranged one or more circuit-breakers which are adapted to be operated by abnormal conditions, and this circuit may be designated as a "primary" circuit. Connected with this primary circuit are one or more secondary circuits, the operation of which is controlled by the primary circuit, and these secondary circuits are connected with a second source of electric energy. This latter source of electric energy is also arranged in connection with the secondary circuits, so that if it fails to operate a signal will be given, and in this way the circuits are interdependent upon each other to a greater or less extent. These secondary circuits may not only be utilized for operating signals of any kind, but for operating any sort of life-saving or other apparatus.

In order that the general principles of our invention may be understod, we have shown in the accompanying drawings an arrangement of circuits suitable for use for indicating leaks in ships, and while we have shown but one circuit-breaker it is understood, of course, that there may be any number, and these may all be connected directly in the primary circuit, in which case, of course, they will simply indicate danger, or they may be otherwise arranged so that each circuit-breaker shall indicate not only that there is danger, but the particular circuit-breaker which has been operated owing to abnormal conditions.

For the sake of clearness in the accompanying drawings the conductors through which the current is supposed to be constantly flowing are shown in thick lines, the secondary circuit receiving current from the primary source of electric energy is shown in full lines, and the circuit or circuits receiving current from the secondary source of electric energy are shown in dotted lines.

E represents a source of electric energy supplying the primary conductor I. Included in this primary conductor I between the portions I and I' is a circuit-breaker P of any suitable character. Also included in the primary circuit is a relay or switch K. This relay K, as shown in the drawings, comprises an electromagnet, the coils $n$ of which are included in the primary circuit, and the armature $f$ of which is therefore held in its attracted position as long as the current flows through the primary circuit; but when the current fails for any reason the armature $f$ under the influence of the spring $h$ closes contact between the points $x$ and $y$ in the secondary circuit. The normal circuit can then be traced from the source of electric energy E through the conductor I, the circuit-breaker P, the conductor I', coils of the magnet of the relay K, the conductor $I^2$, back to the source of energy E. E' represents a second source of electric energy in a constantly-closed circuit including the conductors H' $H^2$ $H^3$, and included in this circuit are the coils of the magnet of a relay K'. Branching from the primary circuit I, as at $i$, is a conductor J, leading through contact-points and including the armature $f'$ of the relay K', thence passing by the conductor J' to an indicating device N, which may be of any usual form, and thence passing by the conductor J² to a signal device S, shown in the form of a bell, and thence by the conductor J³ to the point $j$ in the primary conductor I. Normally this secondary circuit is open when the source of electric energy E' is sufficient to attract the armature $f'$ of the relay K'; but if for any reason this source of energy falls below the normal or fails entirely the armature $f'$ of the relay K' closes the circuit and the indicator and alarm-bell are operated through the secondary circuit J as a shunt from the primary circuit including the source of energy E. Connected to the second closed circuit including the source of energy E', as at $h$, is a shunt including the conductor O, leading to the contact-point $y$ of the relay K, and from this extends a conductor O', leading to the indicator N and thence to the signal S through the conductor J², and thence through the conductor O² to the point $h'$. Also connected to the closed circuit of the source of energy E', as at the point $h^2$, is a conductor M', including a motor M, from which extends a conductor M², leading to the relay K, and this circuit is normally open at the relay; but when the relay K is operated to close the circuit the circuit of the motor M is closed through the conductor O and the motor operated. This motor can operate any suitable apparatus—as, for instance, in the case illustrated, a pump, (indicated by the pipes $p\ p'$.) It will thus be seen that under normal conditions there are two closed circuits, each supplied from a source of electric energy, as E and E'. If, for instance, the current from the source E' fails, the relay K' will be closed and a signal operated through the shunt of the primary circuit including the source of energy E. If, on the other hand, the circuit of the primary source of energy E is broken or fails, the relay K is operated, and the indicator N and signal S are operated by a current from the source of energy E', and thus if either source of energy fails a proper indication and signal will be given at once, and one source of current is, as it were, a check upon the other.

While, as above indicated, any proper form of circuit-breaker may be used in carrying out the general principles of our invention, we prefer (especially in connection with ships) a circuit-breaker substantially as shown in Fig. 3. In this case there is a lever $k\ k'$, pivoted at $o$, and to this lever are attached weights $m\ m'$. The length of the arms $o\ k$ and $o\ k'$ of the lever and the masses of the weights $m\ m'$ are so chosen that the sum of the movements of all the masses about the point $o$ is equal to zero. In Fig. 3 the lever is shown with equal arms, and the masses have the same weight, but different volumes. Normally the lever is kept in indifferent equilibrium by means of a spring $t$ and in this position closes the circuit at the point $z$. When, however, water flows into the apparatus, the inequality of the volumes of the masses or weights $m\ m'$ disturbs the equilibrium, and when the force which disturbs the equilibrium exceeds that of spring $t$ the lever $k\ o\ k'$ assumes a position in which the arm $o\ k$ leaves contact $z$, and the circuit is broken. This circuit-breaker may be inclosed in a protecting-cover D, which should be of such a nature as to permit of water getting access to it, and of course such circuit breaker or breakers may be located in different parts of the ship. With this arrangement it will be seen that any leak occurring and water reaching a circuit-breaker the fact is indicated and the signal operated, and when the circuits are arranged as shown the life-saving appliance, as the pump, is set in operation immediately and automatically. It will further be seen that if there is any failure in either of the primary circuits including the source of electric energy the indicator and signal are at once operated, so that any abnormal disturbance in the circuits is indicated at once.

What we claim is—

1. An automatic electrical indicating device comprising two sources of electric energy, primary circuits for said sources, relays included in said circuits, and secondary circuits respectively connecting the relay of one primary circuit to the other primary circuit, and signal devices in the secondary circuits, substantially as described, whereby when either source of energy fails the signal device will be operated by the other source.

2. An automatic electrical indicating device comprising two sources of electric energy, normally-closed primary circuits therefor, a relay in each of said circuits, a secondary circuit connected to each source of electric energy and including the relay in the primary circuit of the other source of electric energy, and signal devices connected in said secondary circuits, substantially as described.

3. In an automatic electrical indicating device, the combination with two sources of electric energy, a closed circuit for each, and a relay in each of said circuits, of a circuit-breaker included in one of the said closed circuits, secondary circuits each connected to one of the circuits of the sources of electric energy and to the relay in the other circuit, and signal devices in said secondary circuits, substantially as described.

4. In an automatic electrical indicating device, the combination with two sources of electric energy, a closed circuit for each, and a relay in each of said circuits, of a circuit-breaker included in one of said closed circuits, and a motor arranged in a shunt-circuit from the other closed circuit, said shunt-circuit including the relay of the circuit which includes the circuit-breaker, substantially as described.

5. In an automatic electrical indicating device, the combination with two sources of electric energy, a closed circuit for each, and a relay in each of said circuits, of a circuit-breaker included in one of said closed circuits, a shunt-circuit from the other closed circuit including the relay of the first-named closed circuit, a motor in said shunt-circuit, secondary circuits branching respectively from one of the closed circuits and including the relay of the other closed circuit, and signal devices in said secondary circuits, substantially as described.

In witness whereof we have hereunto signed our names in the presence of two subscribing witnesses.

WLADIMIR WASSILI ZVORIKIN.
SERGE DE BLUMENTHAL.

Witnesses:
NICOLAS DAVIDOFF,
BORIS SPOLIANSKY.